(12) United States Patent
Eng et al.

(10) Patent No.: US 6,195,359 B1
(45) Date of Patent: *Feb. 27, 2001

(54) INTELLIGENT ROUTER FOR REMOTE INTERNET ACCESS

(75) Inventors: Robert Chih-Tsin Eng; Robert A. Pebly, both of Boca Raton; John Claude Sinibaldi, Pompano Beach, all of FL (US)

(73) Assignee: International Business Machines Corporation, Armonk, NY (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/951,842

(22) Filed: Oct. 16, 1997

(51) Int. Cl.[7] ................................................ H04L 12/28
(52) U.S. Cl. .......................... 370/401; 370/465; 375/222
(58) Field of Search ..................................... 370/351, 389, 370/392, 401–405, 465–467; 375/222

(56) References Cited

U.S. PATENT DOCUMENTS

| 5,175,733 | 12/1992 | Nugent | 370/94.3 |
| 5,491,720 | 2/1996 | Davis et al. | 375/222 |
| 5,517,620 | * 5/1996 | Hashimoto et al. | 370/60 |
| 5,742,760 | * 4/1998 | Piccazo, Jr. et al. | 370/401 |
| 5,771,232 | * 6/1998 | Sinibaldi et al. | 370/466 |
| 5,799,016 | * 8/1998 | Onweller | 370/401 |

* cited by examiner

*Primary Examiner*—Chi H. Pham
*Assistant Examiner*—Maikhanh Tran
(74) *Attorney, Agent, or Firm*—R. A. Tomlin; R. V. Davidge (57) ABSTRACT

A remote network server includes primary and secondary routers, each of which include means for emulating a number of different modem types, and for operating in accordance with a number of different communication protocols. Incoming calls are directed at the primary router, but are routed through the secondary router if either the type of modem making a call cannot be emulated in the primary router or if the primary router cannot operate with the protocol used by this calling modem.

9 Claims, 7 Drawing Sheets

INTELLIGENT ROUTER FOR REMOTE INTERNET ACCESS

CROSS-REFERENCE TO RELATED APPLICATIONS

This application is related to a co-pending U.S. application, Ser. No. 08/518,215, filed Aug. 23, 1995, entitled "Expandable Local Inter-System Bus Architecture in a Multiplexed Environment," and having a common assignee with the present invention, the disclosure of which is hereby incorporated for reference. This co-pending application describes a communication subsystem providing enhanced processing capability for an information processing system comprising a digital signal processing resource for performing a set of tasks and a first I/O (input/output) port for providing and receiving multiplexed signals in accordance with a first inter-system communication protocol. The communication subsystem comprises (1) a second I/O port for coupling to the first I/O port, and for providing and receiving TDM (time division multiplexed) signals in accordance with the first inter-system communication protocol; (2) digital signal processor means, coupled to the second I/O port, for enhancing processing capability of the digital signal processing resource; and (3) a third I/O port, coupled to the digital signal processor circuit, for providing and receiving signals in accordance with the first or a second inter-system communication protocol.

This application is also related to a co-pending U.S. application, docket number BC9-97-047, filed Oct. 06, 1997, entitled "A DSP-Based, Multi-Bus, Multiplexing Communications Adapter," having a common assignee with the present invention, the disclosure of which is hereby incorporated for reference. This co-pending application describes a pair of communications adapters, which each include a number of digital signal processors and network interface circuits for the attachment of a multi-channel telephone line. A bus connecting the communications adapters can carry data between a network line attached to one of the adapters and the digital signal processors of the other adapter. The digital signal processors on each card are connected to a host, or controller, processor. Each digital signal processor interrupts its host processor by transmitting an interrupt control block as data to a data memory of the host processor, and by subsequently sending an interrupt causing the host processor to examine the data memory. Preferably, the interrupt control block includes data representing a number of requested interrupts.

BACKGROUND OF THE INVENTION

1. Field of the Invention

This invention relates to a system for routing calls to an Internet service provider to local area networks through which such services are available, and, more particularly, to apparatus for routing such calls based on either the function required by the mail, as determined by the modem type, or on the service required by the user, as determined by the telephone number, or other user identification, used to reach the system.

2. Background Information

Computing devices and terminals connected by means of telephone lines include both devices communicating by means of relatively new modems, which are both relatively fast and flexible, and older, legacy devices communicating at slower speeds, with different protocols, and without operational flexibility. Hardware and software incompatibility results when an Internet service provider must service a mixture of both new and legacy devices communicating with his system through the public switched telephone network over a single ISDN line, such as a T1 line in the United States or an E1 line in Europe. The alternative of providing separate ISDN lines for connection to the different types of devices which may call the system providing Internet services is undesirable because of the generally high cost of such lines.

Examples of slow, or legacy modems are asynchronous FSK (frequency-shift keying) modems, such as ITU (International Telecommunications Union) specifications V.21 or V.23. Many recently-built devices do not support connection to such modems. Users having such modems may be well served by connection to such services as Video Text or BBS (bulletin board services).

What is needed is a way to provide different routings through the equipment of the Internet provider receiving a call, to equipment providing different interfaces and protocols, based on the type of modem through which the call is made. Furthermore, what is needed is a system including a primary router making connections with the Internet and similar services, and a secondary router making connections with Video Text, BBS. etc. Furthermore, what is needed is a way to provide a specialized interface allowing access to the Internet from such slow, legacy modems.

A conventional method for discriminating among various users, especially in the case where different users have access to different services of an Internet service provider, is to provide users in different groups with different telephone numbers to use when calling the service provider. What is needed is a method providing differing routings through the equipment of the Internet provider, based on the type of device or modem through which a call is made, so that reliable connections can be made without a need to use different telephone numbers.

DESCRIPTION OF THE PRIOR ART

U.S. Pat. No. 5,491,720 describes a method and system in a data communications system for automatically determining a data communication device type and a transmission speed associated with the data communication device type. An incoming communication is directed on a transmission line, and transmit and receive hardware are connected to the transmission line. Next, a sequence of different signals in either a first communication protocol or a second communication protocol are transmitted from a first data communication device via a transmission line. The transmission line is then monitored for a response signal from a second data communication device. The response signal is initiated from the second data communication device in response to receipt of a particular signal within the transmitted sequence of different signals, a data communication device type and transmission speed are determined, and data communications may then be established between the first data communication device and the second data communication device at an optimal transmission speed.

The method of U.S. Pat. No. 5,491,720 specifically deals with resolving differences between modems when such differences can be resolved through negotiation during an initial phase of a call with a minimum need to switch among communications circuits for the appropriate interconnection circuitry. What is needed is a method for switching to entirely different interconnection circuitry, such as a different router, to accommodate, for example, a modem of a legacy device which cannot communicate with the devices otherwise connected to the server of an Internet provider.

SUMMARY OF THE INVENTION

It is therefore one objective of the present invention to provide a method for routing an incoming call from a port in the public switched telephone network to either a primary LAN or a secondary router, based on a determination of the type of modem used by the device making the incoming calls.

It is another objective of the present invention to provide a system having primary and secondary interconnected routers in which upstream supervisory messages from the secondary router inform the primary router of current capabilities for each channel available within the secondary router and of the number of such channels available.

It is another objective of the present invention to provide a system having a primary router and a secondary router interconnected by a secondary call control channel over which capabilities are negotiated during the establishment of a call.

It is another objective of the present invention to provide a system having a primary router and a secondary router, with functions such as modem emulation, encryption, call verification, and security functions residing in the primary router.

It is another objective of the present invention to provide a system having a primary router and one or more secondary routers functioning as slaves.

It is another objective of the present invention to provide for the movement of data between communications adapters within the primary router over a bus interconnecting such adapters.

DETAILED DESCRIPTION

Figure 1:
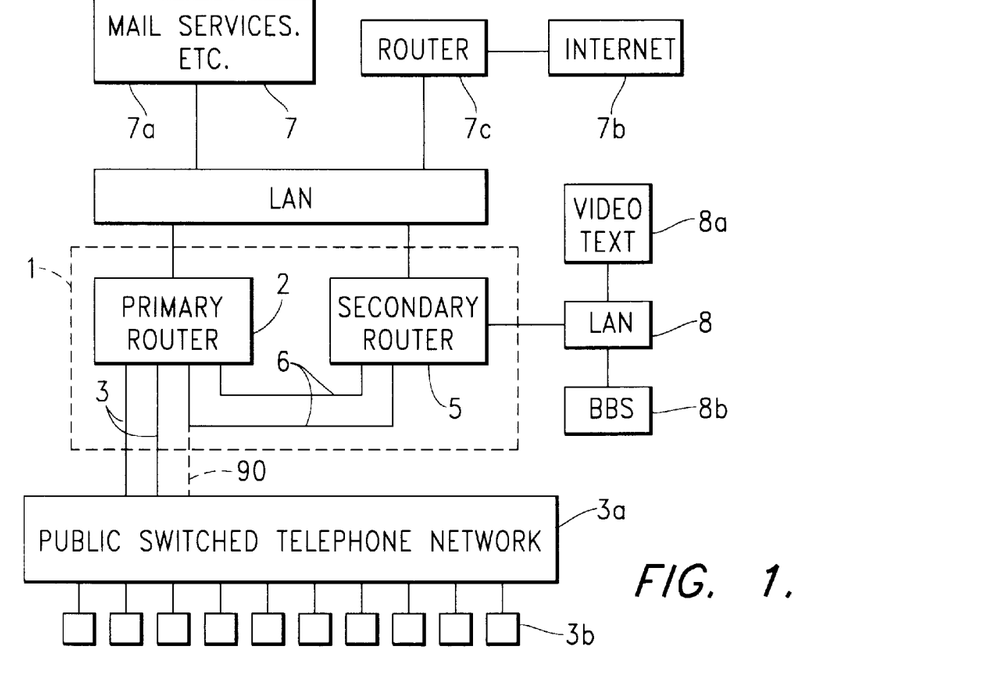
FIG. 1 is a schematic view of a remote access server system built in accordance with the present invention.

FIG. 1 is a schematic view of a remote access server system 1 built in accordance with the present invention. Calls come to a primary router 2 over two ISDN PRI (Integrated Services Digital Network, Primary Rate Interface) lines 3, which are, for example, T1 lines in the United States or Canada, or E1 lines in Europe from the PSTN 3 (public switched telephone network). In the North American version, each of the two ISDN interface lines 3 offers 23 ISDN B (bearer) channels at 64 Kbps (thousand bits per second) and a single ISDN D (data) channel at 64 Kbps. In the European version, each of the two ISDN interface lines 3 offers 30 ISDN B channels and one ISDN D channel. In either case, each such ISDN B channel can be used to carry information through the PSTN 3a (public switched telephone network) to or from a terminal device 3b of a dial-up user, while the ISDN D channel is used for call control. The system also includes a secondary router 4, which is connected to the primary router 5 by means of a pair of T1 or E1 interconnecting lines 6. While this secondary router 5 is not directly connected to the PSTN 3, connections are selectively made, within the primary router 1, between individual channels in the interconnecting lines 6 and corresponding channels in the ISDN lines 3 to the PSTN 3a.

The primary router 2 is connected to a first LAN 7 (local area network) through which a number of subscriber services, such as mail services 7a, are provided. The Internet 7b is also connected to this LAN 7, through another router 7c. The secondary router 5 is connected to a second LAN 8. In accordance with a preferred embodiment of the present invention, the primary router 2 is configured to connect subscriber devices 3b having modems having modern capabilities of speed and flexibility directly with the first LAN 7, and to connect certain other subscriber devices 3b having legacy modems without such capabilities with the secondary router 8. Thus, the first LAN 7 is connected to services such as electronic mail 7a and the Internet 7b which are accessible to devices having such modern modems, while the second LAN 8 is instead connected to service networks such as VIDEO TEXT 8a and one or more BBS's 8b (Bulletin Board Services).

In one version of the present invention, the secondary router 5 also includes means providing for the attachment of certain services, such as the Internet 7b, to legacy modems. In this version the secondary router 5 is also connected to the first LAN 7, by an alternative interconnecting cable 8b, allowing such services to be provided.

Figure 2:
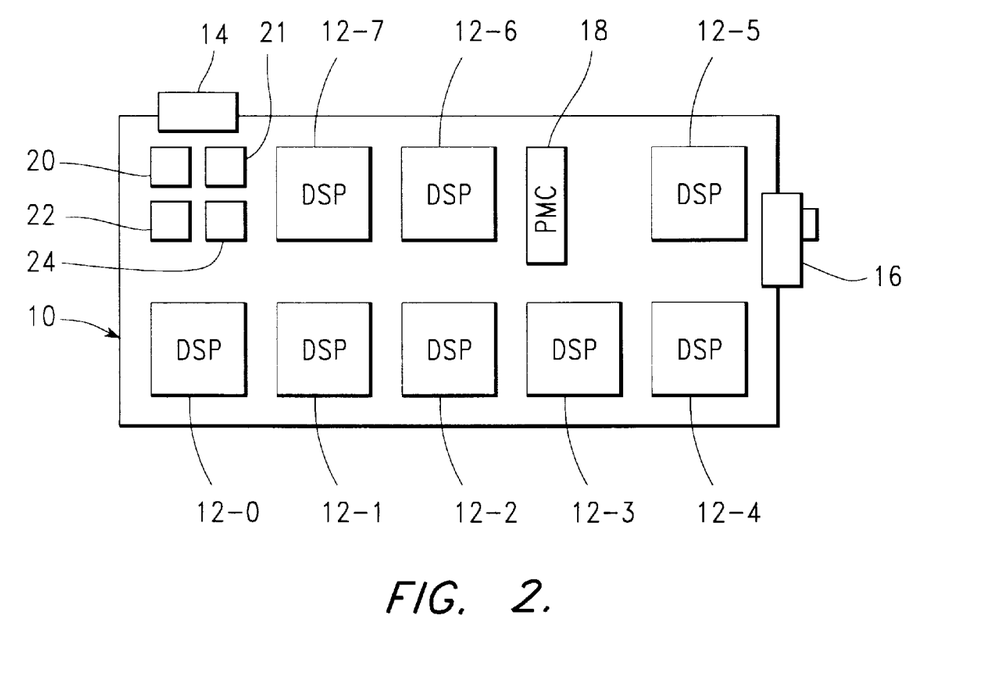
FIG. 2 is a diagrammatic view of a communication adapter card used in both the primary and secondary routers of the server system of FIG. 1.

FIG. 2 is a diagrammatic view of a communications adapter card 10 used in both the primary router 2 and the secondary router 5, within the Internet server 1 of FIG. 1. This card 10 includes eight digital signal processor (DSP) subsystems 12-0 through 12-7, together with provisions for bus connections through an SC-bus connector 14, an E1/T1 interface connector 16, to which either an ISDN network line 3 or an interface line 6 (shown in FIG. 1) is connected, and a PMC (PCI Mezzanine Card) PCI connector 18, by which the communications card 10 is connected as a daughter card to the controller card (to be discussed in reference to FIG. 3). Other major components are an SC-bus switch 20, supporting an SC-bus interface, configured according to SCSA (Signal Computing System Architecture) requirements, through the SC-bus connector 14, a serial to parallel interface 21, and a network interface including a frame aligner 22 and a driver/receiver 24.

Figure 3:
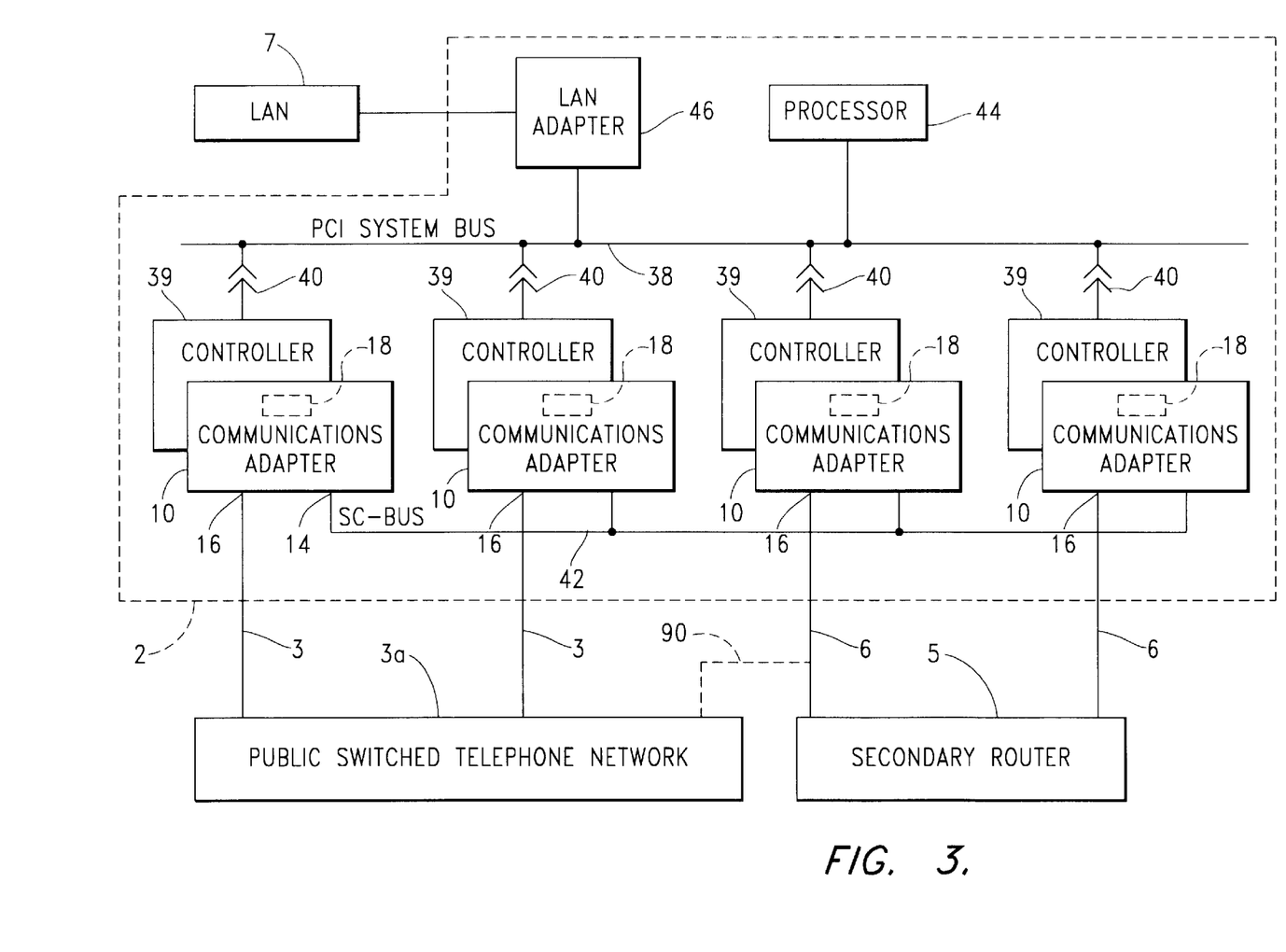
FIG. 3 is a functional block diagram of a primary router in the server system of FIG. 1.

FIG. 3 is a functional block diagram of the primary router 2, within the Internet server 1 of FIG. 1. This primary router 2 is implemented, for example, in an IBM 7588 industrial computer, having a PCI system bus 38. This primary router 2 includes four of the communications adapter cards 10 of FIG. 2, two of which are connected to ISDN network lines 3, and two of which are connected to interconnecting lines 6. The communications adapter cards 10 are also individually connected to four associated controller cards 39, each of which is, for example, an IBM ARTIC 960 PCI Base Controller. Each controller card 39 fits into a card slot of a personal computer supporting a PCI bus 38, which is provided through a connection 40. A PCI bus connection is also made between each controller card 39 and its associated communications adapter card 10 through a PMC PCI connector 18. The communications adapter cards 10 are also interconnected through an SC-bus 42, extending through a ribbon cable atop the cards 10, 39, to be connected through SC-bus connectors 14. All eight DSP subsystems 12 on each adapter card 10 share a common TDM port, dropping and inserting their data at their assigned time slots. The four adapter cards 10 are further interconnected by means of an SC-bus 42 extending among the SC-bus connectors 14 on the cards 10. The system processor 44 of primary router 2 is also connected to the system bus 38, as is a LAN adapter 46 providing for the connection of first LAN 7.

The secondary router 5 includes hardware which is identical or similar to the hardware described above as being within the primary router 2.

Figure 4:
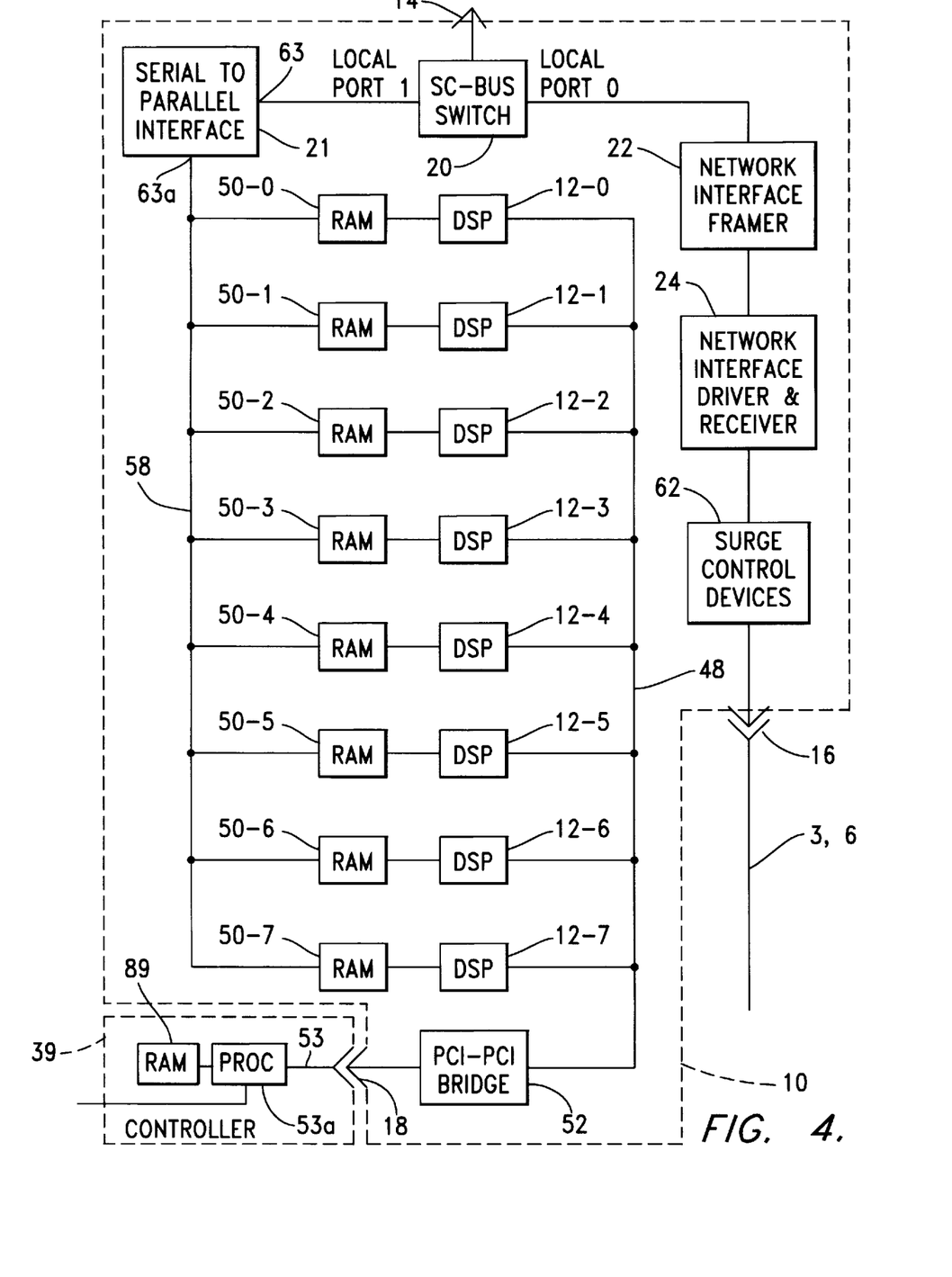
FIG. 4 is a functional block diagram of the communications adapter card of FIG. 2.

FIG. 4 is a functional block diagram of the communications adapter card 10 of FIG. 2, particularly showing the routes of data flow. Each DSP subsystem 12 is connected to a local PCI bus 48 extending along the card 10, and to a two-port data RAM 50 which is provided as a transmit/receive buffer for the corresponding DSP subsystem 12. Each 2-port data RAM 50 is a 1K×8 high-speed static RAM device, such as a Cypress CY7C131 memory module. The PCI bus 48 is connected through a PCI-PCI bridge circuit 52 to a bus 53 extending through the PCM PCI connector 18 into the controller card 39. The PCI bus 48 is a synchronous 32-bit I/O interface running at 33 Mhz. Interrupts A and B, as defined by the PCI local bus architecture, are used, with the DSP subsystem 12-0 connected to interrupt line A, while the DSP subsystems 12-1 through 12-7 are tied together on interrupt line B. All interrupt functions between these DSP subsystems 12 and the controller card 39 are controlled by a processor 53a of the controller card 39, which is, for example, an Intel 80960 processor.

The PCI-PCI bridge circuit 52 electrically isolates the PCI bus 48 from the PCI bus 53 and provides arbitration for the eight DSP subsystems 12 as they request busmaster service. This bridge circuit 52, may each be, for example, a DEC 21150 PCI-PCI Bridge chip, which can handle up to nine devices. The bridge circuit 52 includes a memory space which is divided into standard bridge configuration registers and device-specific configuration registers. The device-specific registers, which are not needed for standard implementations between PCI busses, are not programmed for this application. The standard configuration registers are controlled by the kernel of the controller card processor 53a.

The 2-port data RAM devices 50 are individually connected through an 8-bit data channel 58 to a serial to parallel TDM interface chip 21, which may be, for example, a Mitel MT8920B interface chip. This interface chip 21 is in turn connected to LOCAL PORT 1 of SC-bus switch 20, which may be, for example, a VLSI SC4000 interface chip. This bus switch 20 is in turn connected to the SC-bus connector 14.

The E1 or T1 line 3, 6 is attached to the communications adapter card 10 through the network interface connector 16. Lines from this connector 16 are routed through a network interface including surge control devices 62, network interface driver and receiver 24, and network framer 22. The network interface driver and receiver 24 is, for example, a Siemens PRACT (Primary Rate Access Clock and Transceiver) PEB 22320 chip. The network framer chip 22, is, for example, be a Siemens ACFA (Advanced CMOS Frame Aligner) PEB 2035 chip. The network interface driver and receiver 24 generates the primary clock interface for all of the TDM hardware modules, such as network framer chip 22, the serial to parallel interface 21, and the SC-bus switch 20. The network interface driver and receiver 24 and the network framer chip 22 are controlled by DSP subsystem 12-0, in a manner which will be described in reference to FIG. 5. The network interface circuit 60 also includes transformers for receive and transmit circuits, termination resistors, and diode clamps. While changes in programming can cause the communications adapter 10 to operate in alternate modes as required by attachment to an E1 or T1 line, changes in a hardware configuration of network impedance matching resistors are also required between these modes. Serial transmit and receive lines from the network interface circuit 60 are connected to LOCAL PORT 0 of the SC-bus switch 20.

The communications adapter card 10 supports an SCSA (Signal Computing Systems Architecture) interface at its top edge along a 26-pin connector 14. This interface supplies all of the necessary clocking signals, and sixteen serial data signals for card-to-card communications. This interface has the capability of eight full-duplex T1 or E1 network lines. Additionally, the number of timeslots per frame is programmable to 32 or 64. Preferably, this parameter is programmed to 32 timeslots per frame.

The SC-bus switch 20 supports four local serial port connections, of which only LOCAL PORT 0 and LOCAL PORT 1 are used. The switching function is implemented through two RAM memories, with a destination routing memory controlling data movement from the local ports to the SC-bus 42 (shown in FIG. 3), while a source routing memory controls data movement from the SC-bus 42 to the local ports. The timeslot number serves as the address to either routing memory, while the data stored in the routing memory becomes the switched timeslot number. Actual timeslot serial data is loaded in frame buffers and routed through multiplexing circuits controlled by the destination and source routing memories. There is a one-frame delay for data traveling through the SC-bus switch 20 in either direction.

The SC-bus switch 20 is the main clock source for all TDM clock functions, receiving a reference clock from the network interface driver and receiver module 24, which is synchronized to an incoming data stream received from the network or interconnecting transmission line 3, 6. From this reference clock, the SC-bus switch 20 generates all main SC-bus clocks and all of the local port clocks. The local ports have a 4.096-Mhz bit clock and an 8-Khz frame synch clock, which are supplied to the network interface framer 22 and to the serial to parallel interface 21. When several communications adapter cards 10 are connected by the SC-bus 42, as shown in the example of FIG. 3, the SC-bus switch 20 of one of the cards 10 is programmed to be the master clock source, while the switches 20 on the other cards 10 are programmed to operate as slaves. In this way, the TDM data paths on all the cards 10 are synchronized to a single network or interconnecting line 3, 6. If this single clock source should fail, the SC-bus switches 20 have an ability to switch to another such switch 20 as an alternative master clock source, supporting a soft recovery mode of operation.

The serial to parallel interface chip 21 provides the connection between LOCAL PORT 1 of the SC-bus switch 20 and one port of each of the eight two-port 1K×8 RAM buffers 50. Serial transmit and receive data between the serial to parallel interface chip 21 and the SC-bus 20 is clocked at an E1 line speed of 2.048 Mbits per frame and 8000 frames per second. Data is shifted into one buffer 50 and out of another buffer 50 in full duplex mode. Separate transmit and receive 2-port RAM buffers (not shown) within the serial to parallel interface chip 21 each have one port tied to a separate serial port 63, while the other port of both these buffers is tied to a common parallel port 63a. One byte of transmit data is read from the transmit buffer RAM one channel time before it is shifted out the serial port 63 of this chip 20, and one byte of receive data is written to the receive buffer RAM one channel time after it is shifted in from the serial port 63. The parallel bus 58 extending between the parallel interface chip 21 and the RAM buffers 50 provides an 8-bit data bus and a 5-bit address bus, a WRITE ENABLE pulse, and a READ ENABLE pulse. This interface allows direct connection of the eight RAM buffers 50, being timed to read one byte and write one byte of parallel data as the serial interface from the serial to parallel interface chip 21 is shifting four bits in or out.

The parallel interface port 63a writes all 32 channels of receive data for every frame into all eight two-port RAM buffers 50 simultaneously. In this way, all eight DSP subsystems 12 have access to all received data. On the other hand, parallel transmit data is read from the transmit portion of a single two-port RAM buffer 50 at a time into the parallel interface port 63a.

Each 2-port static RAM buffer 50, being divided into transmit and receive buffers (not shown), stores eight consecutive frames of data to be transmitted or received. All 32 channels for each frame are allocated for both transmit and receive buffers. Each DSP subsystem 12 can access 256 bytes of receive buffer data and 256 bytes of transmit buffer data. The serial to parallel interface 21 requires a dedicated port to each of these buffers continuously. A 3-bit frame counter function is implemented in circuits associated with the DSP subsystem 12-0, which will be discussed in reference to FIG. 5. These three bits, together with the five address bits driven along bus 58 from the serial to parallel interface 21, provide for the selection which must be made among the transmit and receive buffers within the RAM buffers 50. The serial to parallel interface 21 can only read from the transmit buffers within the RAM buffers 50 and can only write to the receive buffers therein. All eight receive buffers are written simultaneously, but only one transmit buffer is read at a time.

The other, opposite port of each two-port RAM buffer 50 is dedicated to an associated DSP subsystem 12, which can only write to the transmit buffer within the RAM buffer 50 and read from the receive buffer therein.

Thus, referring to FIGS. 3 and 4, data received from the transmission line 3, 6 moves as serial data from the network interface connector 16, through network interface devices 24, 22 into the LOCAL PORT 0 of SC-bus switch 20 and outward from the LOCAL PORT 1 of this switch 20 to the serial to parallel interface 21, where it is converted into a parallel format, in which it is carried into the RAM buffers 50. Data from these buffers 50 then flows through the associated DSP subsystems 12 to the internal PCI bus 48, and into the controller 39 through PCI bus 53. Alternately, the data received through the LOCAL PORT 0 in the SC-bus switch 20 is switched to be transmitted through the connector 14 and the SC-bus 42, to be processed through another communications controller 10 in the computing system.

Data to be transmitted on the transmission line 3, 6 flows into the communications adapter 10 through PCI bus 53 and through PCI bus 48 to the DSP subsystems 12. This data is then written into the associated RAM buffers 50, to be sent therefrom, in a parallel format, along the 8-bit data bus 58, to the serial to parallel interface 21. In this interface 21, the data is converted to a serial format, to be directed through SC-bus 42 into the network interface devices 22, 24. This data is then driven into the network or interconnecting line 3, 6 through interface connector 16. Alternatively, the SC-bus switch 20 can direct data received through LOCAL PORT 1 from the serial to parallel interface 21 outward through the SC-bus connector 14 to the SC-bus 42, to be transmitted from a network or interconnecting line 3, 6 connected to another communications adapter 10.

Figure 5:
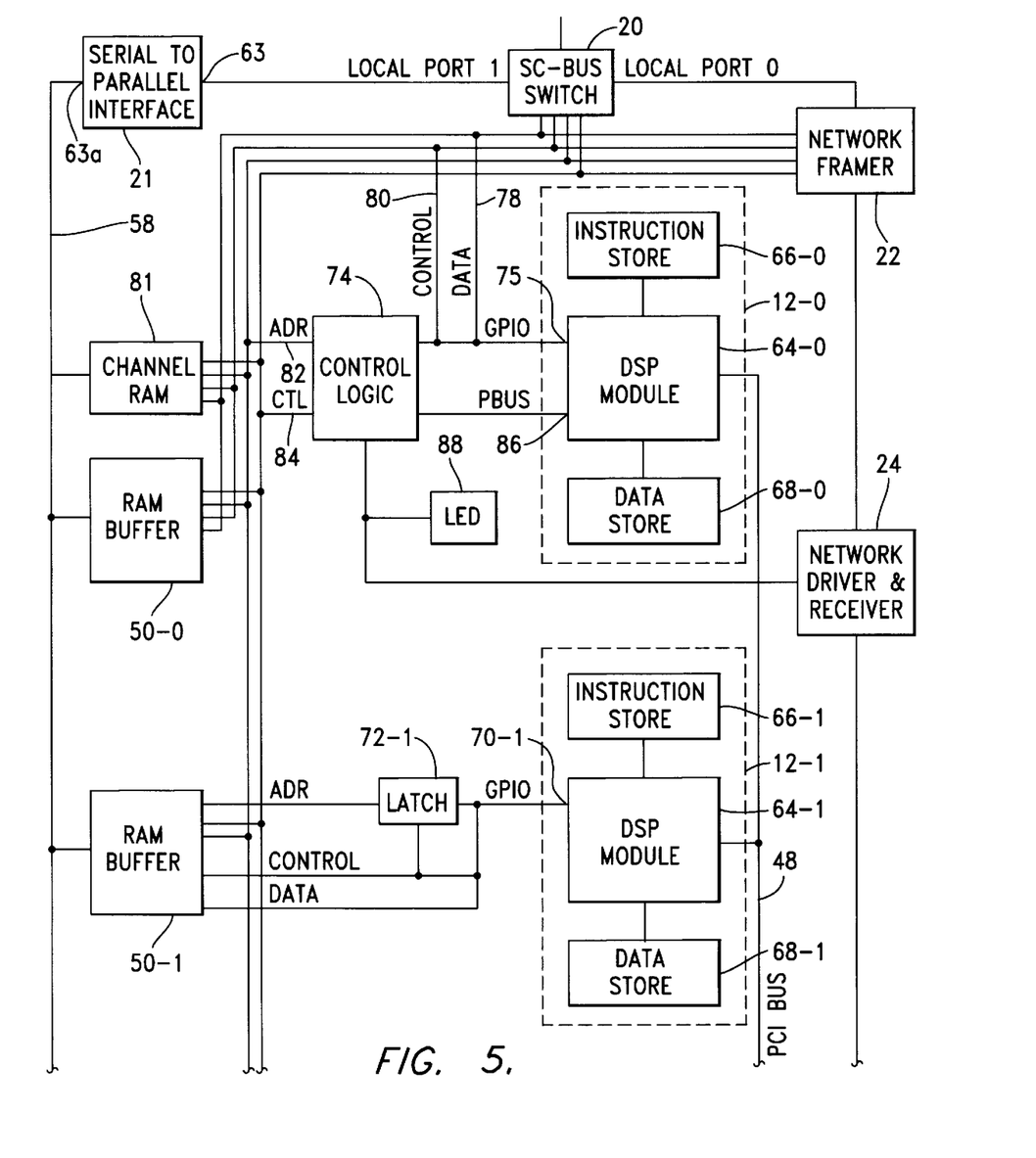
FIG. 5 is a functional block diagram of DSP subsystems and related circuits in the communications adapter card of FIG. 2.

FIG. 5 is a block diagram of DSP subsystems 12-0, 12-1 and associated circuits. This diagram also applies to six other DSP subsystems 12-2 through 12-7, which are identical to subsystem 12-1. The DSP subsystem 12-1 includes a DSP module 64-1, which is, for example, an MWAVE 3780P module, 128K×24 instruction storage 66-1, and 128K×16 data storage 68-1. The DSP module 64-1 drives the static RAM buffer 50-1 with its 16-bit GPIO port 70-1 and with an external 8-bit address latch module 72-1. The control code executing in DSP module 64-1 can only write to the transmit buffer area in RAM buffer 50-1, and can only read from the receive buffer area in this buffer 50-1.

The sixteen bits of the GPIO port 70 of each DSP module 64 can be programmed to be input only, output only, or bidirectional A single DSP instruction can change the polarity of output bits, read the current state of the 16 bits, or tri-state a set of bits. Since only a single function can be performed with each DSP instruction, it requires a series of instructions to perform a timed sequence controlling an external device. In the communications adapter card 10 (shown in FIG. 4) nine DSP instructions are required to read and write a single address in the two-port RAM buffer. Each DSP subsystems 12-1 through 12-7 only control two devices, the associated RAM buffer 50 and a frame counter (not shown). Thus, hardware for only these two devices is implemented in connection with these subsystems 12-1 through 12-7. However, the DSP code executed within these subsystems is identical to that of the DSP subsystem 12-0, which controls several additional devices. Each DSP subsystem 12 determines which devices to control by reading a subsystem ID value from its DSTORE memory space.

Again, the DSP subsystem 12-0 includes a DSP module 64-0, 128K×24 instruction storage 66-0, and 128K×16 data storage 68-0. The DSP subsystem 12-0 also has an associated static RAM buffer 50-0, but its control is handled through an external control logic module 74, which may be implemented, for example, using a PAL (Programmable Array Logic) chip from Advanced Micro Devices. The control logic module 74 also provides ADDRESS and CONTROL outputs through which the DSP subsystem 12-0 establishes read/write control of the SC-bus switch 20, and the network interface framer 22. The DSP module 64-0 uses its parallel, bidirectional GPIO port 75 as a data bus 78 and a control bus 80 to read and write to registers in the network framer 22, in the SC-bus switch 20, in a two-port channel RAM circuit 81, and in the two-port data RAM buffer 50-0. A read or write to a register within the network framer 22 requires a sequence of DSP instructions which manipulate the GPIO port 75 to match the required timings for an I/O cycle of the network framer 22. The GPIO port 75 also supports an interrupt function to monitor signalling and error status from the network framer 22. Address lines 82 and additional control lines 84 also extend to these circuits 20, 22, 81, and 50-0 from control logic module 74. The address lines 82 and control lines 80, 84 are also extended to two-port data RAM buffers 50-1 through 50-7, so that the DSP subsystem can control operation of these devices. To prevent read/write access conflicts, each DSP subsystem 12-0 through 12-7 can monitor the value of a common frame counter within control logic 74. Each DSP subsystem 12 uses this information to avoid writing in locations in both the transmit and receive buffers of its associated RAM buffer 50, when these buffers are being used by the serial to parallel interface 21.

Control of the network interface driver and receiver 24 is established through the PBUS port 86 of the DSP module 64-0. This port 86 acts as an 8-bit slave ISA interface, with only write commands being needed to set latches in the control logic 74. The PBUS port 86 is self-clocking, requiring only one DSP instruction to issue a write command to the driver and receiver module 24, which only accepts write command from the PBUS port 86. A yellow/green LED 88 is also controlled in this way, providing a viable indication of the use of the communications adapter card 10, at its end, which can be seen at the rear of the computer 1 (shown in FIG. 1).

The two-port channel RAM module 81 is a single 1K×8 device controlled only by DSP subsystem 12-0. Only 64 locations are used within this RAM module 81, forming a first 32-location buffer used by the serial to parallel interface 21 (shown in FIG. 4) and a second 32-location buffer used by the DSP subsystem 12-0. These two buffers are separated by an address bit controlled by a ping pong latch. Since the polarities of the two outputs of the ping pong latch are always opposite one another, both port addresses never simultaneously include the same value, preventing read/write conflicts from both ports to a common internal array. The DSP subsystem 12-0 controls the state of the ping pong latch. When the DSP subsystem 12-0 is using one buffer, the serial to parallel interface 21 is using the other. When the state of the ping pong latch is flipped, the buffers are reversed. This operation allows the DSP subsystem 12-0 to pre-load or modify channel or subsystem site information before turning over this new or updated buffer information to the series-to-parallel interface 21.

The MWAVE 3780P module contains a 44 MIP ISP-5.6 DSP core which can access 128K of 24-bit instructions and 128K of 16-bit data storage. This module is a multifunction device containing PCI functions for DSP, UART, MIDI, Soundblaster, Soundblaster DMA Controller, and three PBUS parallel devices. In the example of the present invention, only the DSP device is configured for the PCI interface. Only in the DSP module 64-0, the three PBUS devices are used by the DSP core, but not by the PCI interface. There are three additional serial I/O ports available from each MWAVE module, but they are left unconnected, as they are not used. All of these additional peripheral interfaces and unused device functions are disabled and powered down through peripheral control and power management registers to minimize power consumption and to avoid resource conflicts.

Each DSP module 64 uses an internal clock generator driven by an external 33.8688 Mhz oscillator. This internal PLL (Phase-Locked Loop) clock generator is programmable, allowing instruction cycle rates from a minimum of 17 MIPs to a maximum of 44 MIPs. In the example of the present invention, all DSP modules 64-0 through 64-7 are set to run at 44 MIPs.

Referring again to FIG. 4, both the controller processor 53a and the DSP subsystems 12 are able to interrupt one another across the connected PCI busses 48, 53. A single-threaded interrupting protocol is used within the system to prevent overruns. Four interrupt signals are supported by lines within a PCI bus. The DSP subsystem 12-0 is connected to INTERRUPT A, and the DSP subsystems 12-1 through 12-7 are all connected to INTERRUPT B, with INTERRUPTS C and D being neither used nor connected. When a DSP subsystem 12 wishes to interrupt the controller processor 53a, it writes to its own MSA address '8000 0060'h, the HBRIDGE interrupt register within the PCI-PCI bridge 52.

While the sixteen bits in the HBRIDGE interrupt register are conventionally used to represent up to sixteen different types of service, a DSP subsystem 12, operating in accordance with the present invention, sends a control block of data representing interrupt(s) to be requested into a predetermined area within the data memory 89 of the controller card 39 by means of a DMA (Direct Memory Access) process. Then, the DSP subsystem 12 sets any bit to send an interrupt through the PCI busses 48, 53. When the controller processor 53a receives this interrupt, it determines that DSP subsystem 12-0 has requested an interrupt if the interrupt is received on the INTERRUPT A line, or that one of the DSP subsystems 12-1 through 12-7 has requested an interrupt, if the interrupt is received on the INTERRUPT B line.

Figure 6:
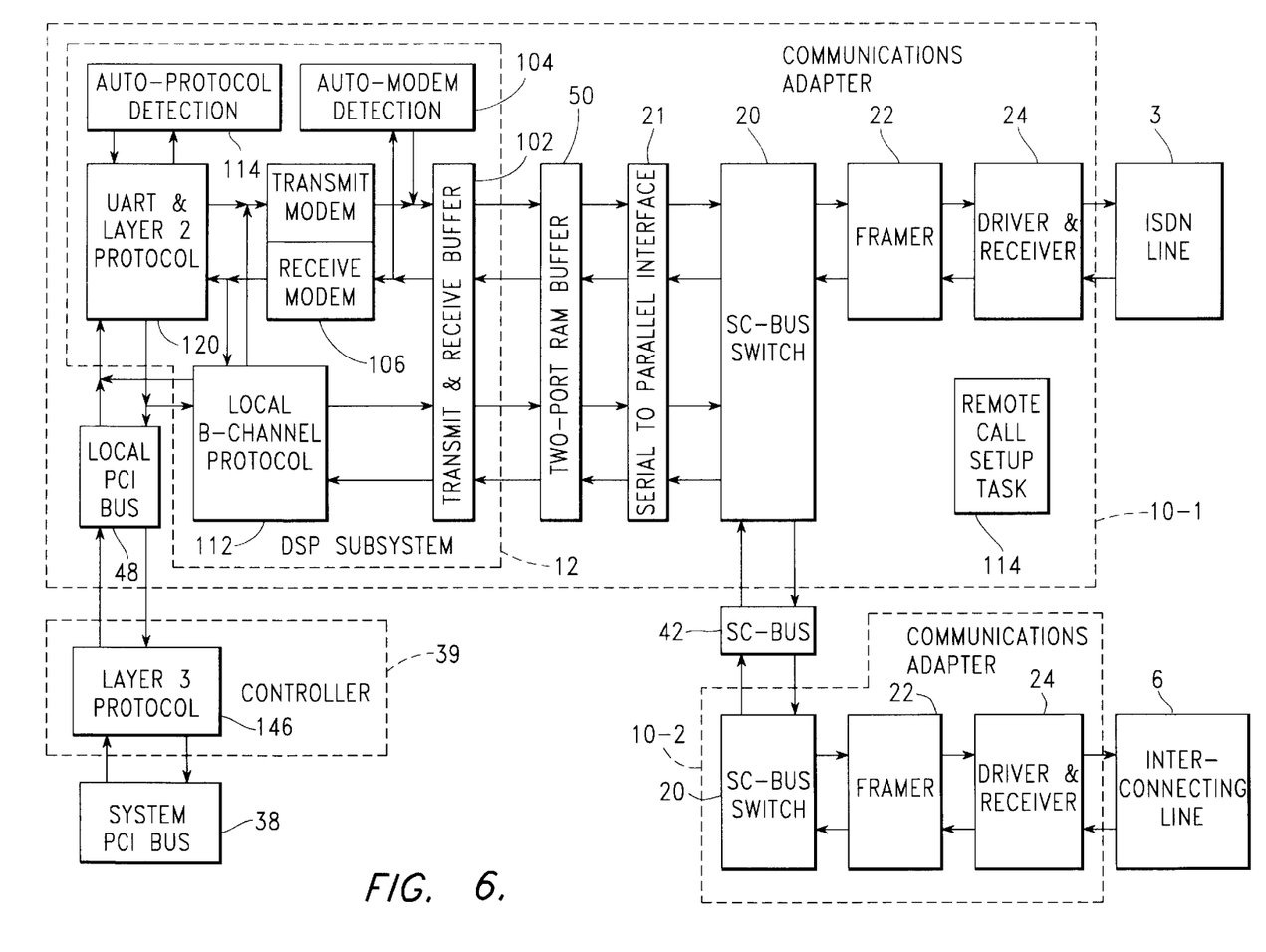
FIG. 6 is a functional block diagram showing how a call on a single channel of an ISDN line is switched within the primary router of FIG. 3.

FIG. 6 is a block diagram showing how a single channel of an ISDN line 3 is switched within the primary router 2 following the initiation of a call from a subscriber unit 3b (shown in FIG. 1) to a communications adapter 10-1 connected to an ISDN line 3. As previously described in reference to FIG. 4, data received from the ISDN line 3 flows through the network interface circuits including a driver and receiver 24 and a framer 22. The data is next directed through SC-bus switch 20 and through the serial to parallel interface 21 to the receive buffer within a two-port buffer 50. The data is then moved to a receive buffer within transmit and receive buffers 102 in the DSP subsystem 12 associated with the particular two-port buffer 50 in which it was previously stored. This transmit and receive buffer 102 is part of the data store 68 (shown in FIG. 5) within this DSP subsystem 12.

During the first portion of a received call, a primary auto-modem detection task 104 is running on the DSP subsystem 12 to determine the modem type is being established by the call. This task includes, for example, modem detection routines described in detail in U.S. Pat. No. 5,491,720. Thus, after a connection is established through a channel within an ISDN network line 3 between the primary router 2, and the calling subscriber unit 3b, a sequence of signals is directed to the calling subscriber unit 3b from the primary router 2. This channel within the ISDN line 3 is then monitored by the primary router 2 for a response signal from the calling unit 3b. This response signal, which is initiated in response to receipt of a particular signal within the transmitted sequence of different signals, reveals the data communication device type and transmission speed. The task 104 running within the DSP subsystems 12 uses this information to determine the type and speed of the calling modem. In accordance with a preferred version of the present invention, tasks to emulate certain modems are available on each DSP subsystem 12 within the communications adapter 10-1 of the primary router 2, while tasks to emulate other modems ar available on each DSP subsystem 12 on a communications adapter 10-3 (to be discussed in reference to FIG. 8) on the second router 5 (shown in FIG. 1). Thus, if the subscriber modem type detected by task 104 is available on the adapter 10-1, the modem emulation task emulates this modem at block 106; otherwise the B-channel protocol 112 is set for the connection of the call to the second router 5. This protocol 112 sets up communications over the interconnecting line 6 between the routers 2, 5.

Similarly, in accordance with a preferred version of the present invention, certain communication protocols are available on each DSP subsystem 12 on the communications adapter 10-1 of the primary router 2, while other communication protocols are available on each DSP subsystem 12 on the communications adapter 10-3 on the second router 5.

Figure 7:
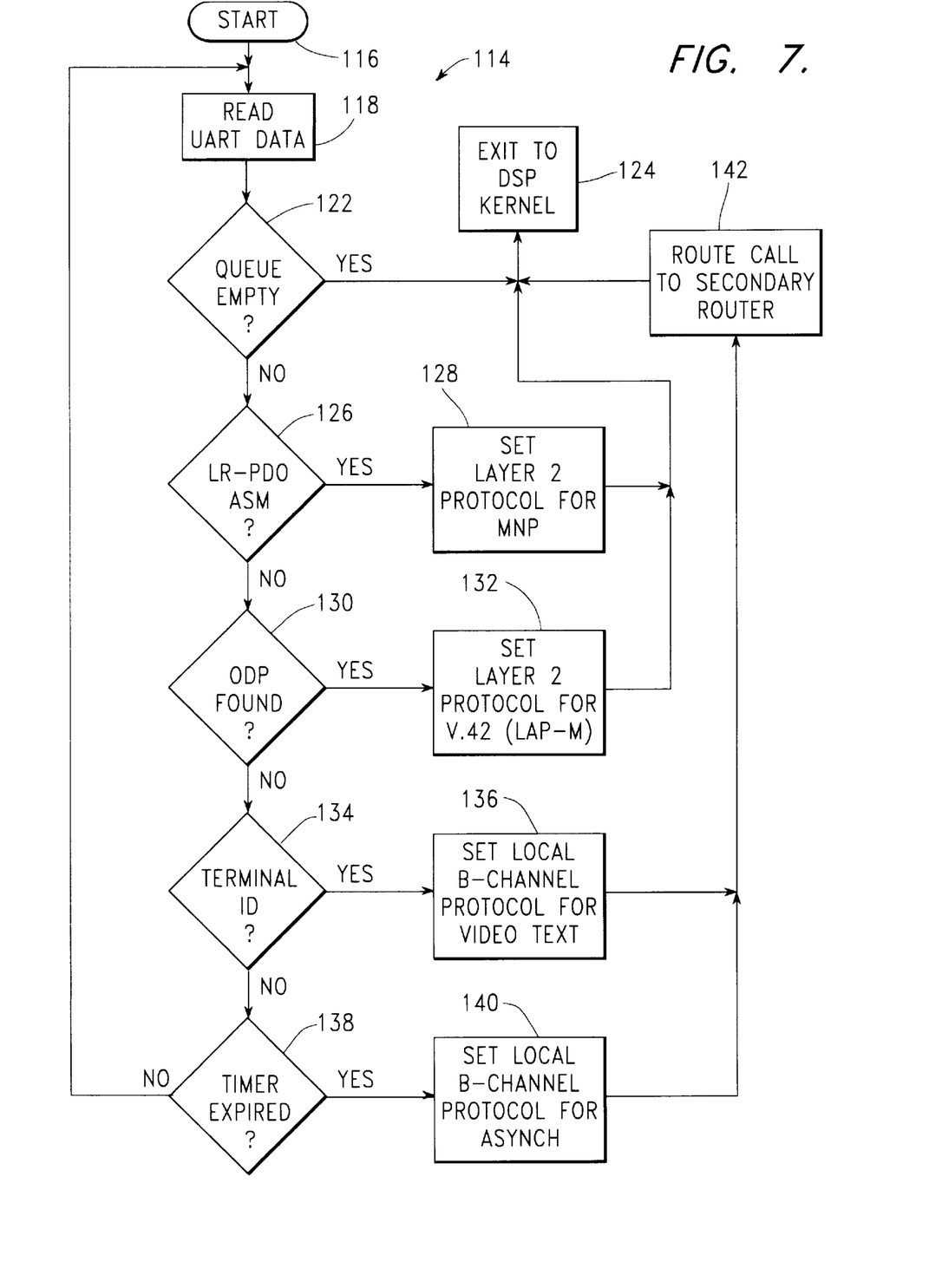
FIG. 7 is a flow chart of a protocol detection task within a DSP subsystem of the primary router of FIG. 3.

FIG. 7 is a flow diagram indicating operation of an auto-protocol detection task 114 running on the DSP subsystem 12. Referring to FIGS. 6 and 7, this task begins in block 116, reading the data, in block 118, within in a queue maintained by the UART (Universal Asynchronous Receiver Transmitter) portion of task 120. At this point, if the calling subscriber unit has returned a protocol, it should be within this queue. Nevertheless, it the queue is empty, as indicated in block 122, this task exits, in block 124, to the DSP kernel, which may try the test again after a short period. Next, in block 126, this task determines if an LR-PDU (Link Request-Protocol Data Unit) has been assembled within the queue data. If it has, an MNP (Microcom Networking Protocol) protocol has been sent, so the Layer 2 Protocol portion of task 120 is set for this protocol in block 128. Otherwise, the task determines, in block 130, if an ODP (Originate Detection Pattern) code is found in the queue data. If it has, an ITU specification V.42 (LAP-M) protocol has been sent, so the Layer 2 Protocol portion of task 120 is set for this protocol in block 132. In this example, both of these protocols are available in the DSP subsystem 12 on the communications adapter 10-1 of the primary router 2, so the call is not routed to the secondary router 5.

Next, the task 114 checks for protocols which are not available on this communications adapter 10-1. In block 134, the task determines if a terminal ID is present in the queue data. If it is, the local B-channel protocol 112 is set for a Video Text Protocol in block 136. Otherwise, the task determines, in block 138, if enough time has expired to indicate that the data within the queue does not include an identifiable protocol. If it has, an assumption is made that asynchronous communications are being attempted, so that B-channel protocol is set for this condition in block 140. After the B-channel protocol is set in block 136 or 140, the call is routed to the secondary router 5, in block 142. In any case, the task finally returns to the DSP kernel in block 124. While FIG. 7 is intended to be exemplary, it is understood that many more protocols may be made available both within the primary router 2 and the secondary router 5.

Thus, the call is directed to the secondary router 5 if it requires a modem emulating task which is available on the secondary router 5 but not on the primary router 2. If the modem emulation is available on the primary router 2, it is established there, but the call may still be routed to the secondary router 5 if the protocol required by the call is available on the secondary router 5 but not on the primary router 2, with modem emulation remaining on the primary router.

Continuing to refer to FIG. 6, If the call is not routed to the secondary router 5, a Layer 2 protocol routine within block 120, also executing within the DSP subsystem 12 modifies the data, which is then transferred from the subsystem 12 across the local PCI bus 48 on the communications adapter 10 to the controller 39, on which a Layer 3 protocol routine 146 is running to further modify the data. A D-channel protocol (not shown) is also running to provide call controlling signals in the D-channel of the ISDN line 3. The data is next transferred to the PCI system bus 38, where the data channel is, for example, connected with the LAN 7 through a LAN adapter 46 (shown in FIG. 2).

On the other hand, if it is determined by the tasks 104, 114 that the call on this particular channel of the ISDN line 3 is to be routed to the secondary router, a local B-channel protocol is developed within task 112 of the DSP subsystem 12, and the channel is connected through the transmit registers of transmit and receive register 102 and of two-port buffer 50. Next, the data being transmitted is converted into a serial signal in the serial to parallel interface 21 and switched to the SC-bus 42 in SC-bus switch 20. This serial signal is next transmitted to a second communications adapter 10-2, to which an interconnecting cable is attached, by means of the SC-bus 42.

The DSP subsystem 12 used for processing an individual call in this way can be any one of the DSP subsystems 12-0 through 12-7. However, certain functions are reserved for the DSP subsystem 12-0, as described above in reference to FIG. 5. One such function is the remote call setup task 114, which is performed on the DSP subsystem 12-0 regardless of the DSP subsystem 12-0 through 12-7 handling the particular call. This setup task 114 establishes the call directed along an interconnecting cable 6. On the second communications adapter 10-2, to which an interconnecting cable 6 is attached, the channel on which the call has been made is connected to this interconnecting cable through an SC-bus switch and through network interface circuits 22, 24.

Operation of the system at this point in accordance with a preferred version of the present invention provides an advantage of establishing a connection through a secondary router more rapidly than conventional methods, which establish a new telephone call to provide a connection through secondary switching circuits. The setup task 114 preferably begins setting up a channel through the interconnecting cable as soon as an incoming call is recognized.

Figure 8:
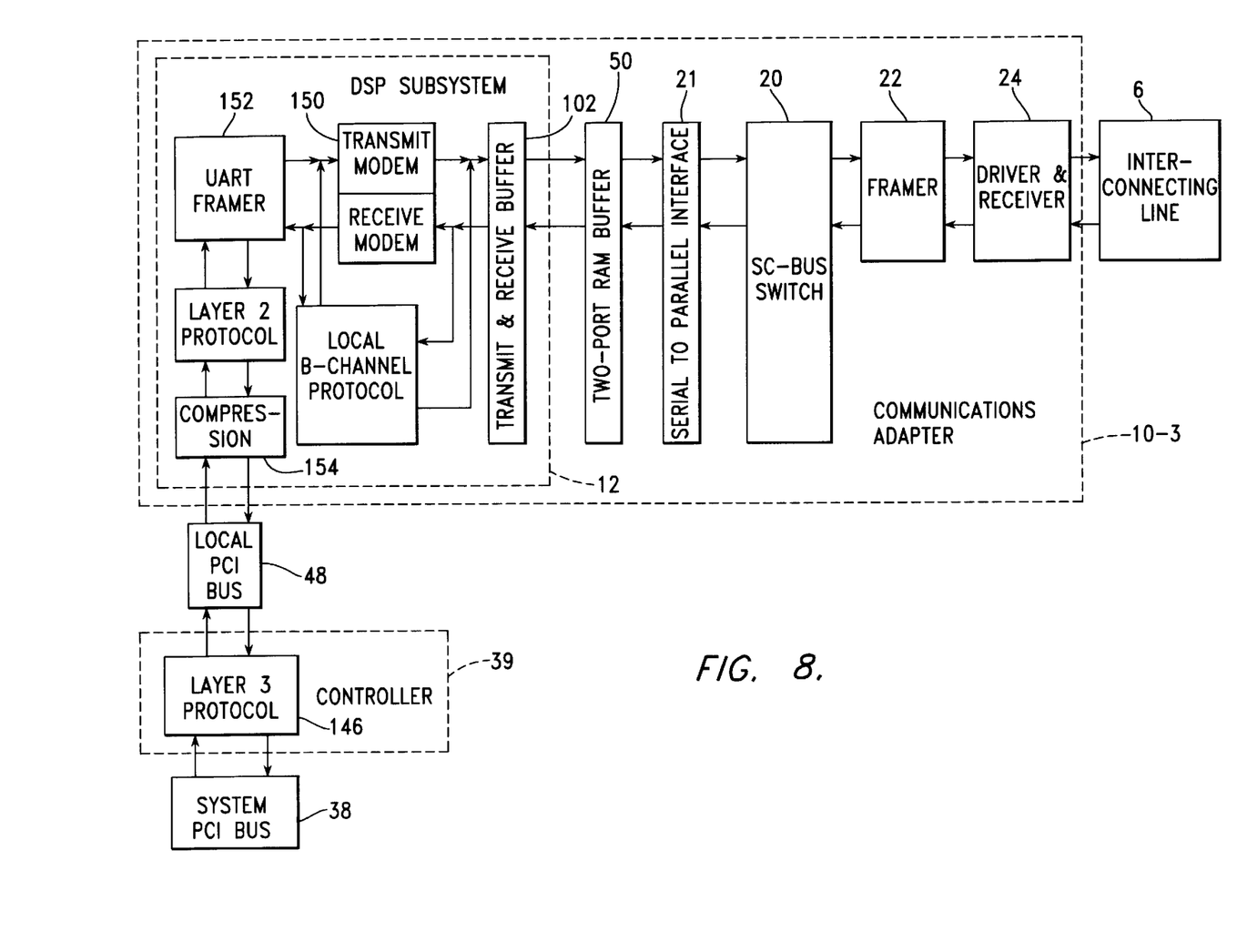
FIG. 8 is a functional block diagram showing how a call is switched within the secondary router of the system of FIG. 1.

FIG. 8 is a block diagram showing the routing of a call through a communications adapter 10-3 on the secondary router 5. This adapter 10-3 is similar to the adapter 10-1 which has been described in detail in reference to FIG. 6, except that the tasks running in each DSP complex 12 of this adapter 10-3 differ from those running in each DSP subassembly 12 of the adapter 10-1. If it has been determined, as described above in reference to FIG. 6, that a modem emulation task resident on this adapter 10-3 is needed, this modem emulation task 150 is activated. Otherwise, modem emulation remains on adapter 10-1. If modem emulation occurs on the adapter 10-1, data is sent along the interconnecting cable 6 as a digitized signal. If modem emulation occurs on the adapter 10-3, data is sent along the interconnecting cable 6 as a digitized analog signal. The DSP subsystem 12 also executes different tasks, such as a UART framer 152 operable with lower speed modems, and a data compression task 154.

Referring again to FIG. 1, the Internet server 1 may be configured and operated as either a fixed mapping system or a dynamic mapping system. For fixed mapping, there are as many channels available in the interconnecting cables 6 as in the ISDN network lines 3. This is the situation naturally occurring as described above, when two network lines 3 extend to the PSTN 3a from the primary router 2, with two interconnecting lines 6 extending between the routers 2, 5. This arrangement is adequate for handling even an extreme case, in which all the calls made to the primary router 2 are currently directed through the secondary router 5. With fixed mapping, there is a one-to-one correspondence between the channels, or timeslots, on each interconnecting line 6 and the channels, or timeslots, on a corresponding ISDN line 3. Each DSP subsystem 12 in the primary router 2 attached to an ISDN line 3 having two sets of circular buffers for each TDM timeslot supported, with the first such set of buffers being for network communications along the ISDN line 3 connected to the adapter 10, while the second set is for SC-bus communications to another adapter 10 within the primary router 2.

The Internet server 1 can be configured for dynamic mapping by reducing the number of channels available within the interconnecting cables 6 while increasing the number of channels available in the network cables 3 extending to PSTN 3a. For example, the primary router 2 may be configured with three network cables 3, and with only one interconnecting cable 6. This variation is shown in FIGS. 1 and 3 by means of a dashed alternative connecting line 90. This type of configuration is advantageous when the subscriber devices 3b are predominantly of types having modern, high-speed modems, with relatively few devices 3b having legacy modems. This type of configuration is also advantageous when a predominant portion of the calling traffic requests connection with services, such as the Internet 7b, through the primary router 2.

For dynamic mapping, the remote call setup task 114, described above in reference to FIG. 6, includes a timeslot mapping task, with a table of available timeslots on the interconnecting cable 6 being maintained in the memory of this task on each DSP subsystem 12 on a card to which a network line 3 is attached. When a call is initiated to be routed to the secondary router 5, the timeslot mapping task finds the next available timeslot and a command to the secondary router 5 to prepare for an incoming call on this timeslot.

In an alternative version of the present invention, incoming calls are routed between the primary router 2 and the secondary router 5 on the basis of the functions available within the networks accessed by the two routers 2, 5. The interconnecting cable(s) 6 include an ISDN D channel, which is used to determine a time slot to be established for an individual call and to negotiate available resources. For example, before a connection is established through an ISDN B channel in the interconnecting cable(s) 6, the primary router 2 may require information on the availability, maximum input data rate, and maximum dictionary size for data compression within the secondary router 5, or on the availability of various protocols within the secondary router 5. During the establishment of a connection over the interconnecting cable(s) 6, the primary router 5 provides the secondary router 5 with, for example, a request for data compression or for a synchronous protocol.

With this alternative version, the secondary router 5 may be used to handle incoming ISDN calls, with the data being fed directly to the secondary router 5 in a bypass operation eliminating processing by the primary router 2. Alternately, the OSI layer 2 protocols may be implemented within the primary router 2, with data across the interface between layers 2 and 3 being transferred across the interconnecting cable(s) 6.

When an incoming call is made from a modem, data can be routed for modem emulation by either the primary router 2 or the secondary router 5. For example, the secondary router 5 is used to demodulate calls from low speed modems requiring a low level of processing speed from the DSP subsystems 12 involved in demodulation, while the high speed modems are fully emulated within the primary router 2. If a calling device 3b requests decompression, this process occurs within the secondary router 5, allowing compressed data to be transmitted the interconnecting cable(s) 6 without compromising bandwidth limitations.

The routers 2, 5 preferably include particular functions for handling incoming calls including DTMF (Dual Tone Multi Frequency) data, which may be provided from a telephone keypad, and voice data. For example, the primary router 2 demodulates and decodes the DTMF data, while voice requests are routed through the secondary router.

Negotiations for the available functions of the secondary router 5 over the interconnecting cable(s) 6 may alternately be carried out ISDN B channels, using standard HDLC frames. After a connection is thus established, data transfer at a lower modem data speed is sub-multiplexed over an ISDN B channel in accordance with ITU standards V.110 or V.120.

A plural number of secondary routers, each having a different combination of available services, may be used in combination with a single primary router.

It is understood that various features and processes of the present invention can be combined in various ways with one another or with other features and processes without departing from the scope of the invention. For example, the conventional method of using different telephone numbers to reach different services may be combined with the call switching capabilities of the present invention. While the word "Internet" has been used as an example herein, it is understood that various types of network services may alternately or additionally be provided.

What is claimed is:

1. A remote network server including:
   a primary router comprising
      a first primary connection interface for attachment of a first network line,
      a second primary connection interface for attachment to an interconnecting line,
      primary modem emulation means for emulating a modem type within a first plurality of modem types, connected to an electrical circuit extending from said first primary connection interface,
      primary processing means for determining, in response to signals transmitted along said first network line, a type of modem connected to said first primary connection interface through said first network line,
      a third primary connection interface for attachment to a first local area network, and
      primary switching means for connecting said electrical circuit extending from said first primary connection interface with said second primary connection interface in response to a determination by said primary processing means that said type of modem connected to said first primary connection interface through said first network line is not among said first plurality of modem types;
   a secondary router comprising
      a first secondary connection interface for attachment of said interconnecting line,
      secondary modem emulation means for emulating a modem type within a second plurality of modem types, connected to an electrical circuit extending from said first secondary connection interface, and
      a second secondary connection interface for attachment to a second local area network; and
   an interconnecting line extending between said second primary connection interface and said first secondary connection interface.

2. The remote network server of claim 1, wherein said primary processing means executes a task during a first portion of a cell received from a calling unit, following establishment of a connection through a channel to said primary router, to determine a modem type of said calling unit, and wherein said task performs steps of:

sending a sequence of initial signals to said calling unit;

monitoring said channel for a signal responding to said sequence of initial signals; and determining a device type and communication speed of a modem of said calling unit in response to said signal responding to said sequence of initial signals.

3. The remote network server of claim 2, wherein said step of monitoring said channel includes reading data within a queue maintained by a universal asynchronous receiver transmitter for said signal responding to said sequence of initial signals.

4. The remote network server of claim 3, wherein said step of determining a device type and communication speed of a modem includes determining when a link request-protocol data unit has been assembled within said data within said queue and then setting a layer 2 protocol for a microcom networking protocol.

5. The remote network server of claim 3, wherein said step of determining a device type and communication speed of a modem includes determining when an originate detection pattern code is found within said data within said queue and then setting a layer 2 protocol for a an ITU specification V.42 (LAP-M) protocol.

6. The remote network server of claim 3, wherein said step of determining a device type and communication speed of a modem includes determining when a terminal ID is present in the queue data and then setting a protocol for a Video Text protocol.

7. The remote network server of claim 1, wherein said primary modem emulation means emulates each modem type within said first plurality of modem types, and said secondary modem emulation means emulates each modem type within said second plurality of modem types.

8. The remote network server of claim 7, wherein:

said primary router additionally comprises a first plurality of interconnected digital signal processor subsystems, said primary emulation means emulates each modem type within said first plurality of modem types by executing a task within a first plurality of tasks, tasks within said first plurality of tasks are individually executed within various digital signal processor subsystems within said first plurality of interconnected digital signal processors subsystems, said secondary router additionally comprises a second plurality of interconnected digital signal processor subsystems, said secondary emulation means emulates each modem type within said second plurality of modem types by executing a task within a second plurality of tasks, and task within said second plurality of tasks are individually executed within various digital signal processor subsystems within said second plurality of interconnected digital signal processor subsystems.

9. The remote network server of claim 1, wherein calls into said primary router are routed through said primary switching means in accordance with capabilities of said first and second local area networks.

* * * * *